(12) United States Patent
McEvoy et al.

(10) Patent No.: US 9,852,276 B2
(45) Date of Patent: Dec. 26, 2017

(54) SYSTEM AND METHODS FOR VALIDATING AND MANAGING USER IDENTITIES

(71) Applicant: Scayl, Inc., Sunnyvale, CA (US)

(72) Inventors: Michael McEvoy, Woodland, WA (US); Donald L. Hoffman, Woodland, WA (US); Donald Bradford, Kyburz, CA (US)

(73) Assignee: Scayl. Inc., Woodland, WA (US)

( * ) Notice: Subject to any disclaimer, the term of this patent is extended or adjusted under 35 U.S.C. 154(b) by 0 days.

(21) Appl. No.: 14/791,339

(22) Filed: Jul. 3, 2015

(65) Prior Publication Data

US 2016/0004852 A1 Jan. 7, 2016

Related U.S. Application Data

(60) Provisional application No. 62/020,878, filed on Jul. 3, 2014.

(51) Int. Cl.
*H04L 29/06* (2006.01)
*G06F 17/30* (2006.01)
*G06F 15/16* (2006.01)
*G06F 7/04* (2006.01)
*G06F 21/31* (2013.01)
*G06F 21/62* (2013.01)
*H04L 12/58* (2006.01)

(52) U.S. Cl.
CPC .............. *G06F 21/31* (2013.01); *G06F 21/62* (2013.01); *H04L 63/08* (2013.01); *H04L 63/0876* (2013.01); *H04L 63/126* (2013.01); *G06F 2221/2111* (2013.01); *H04L 51/00* (2013.01)

(58) Field of Classification Search
CPC .. G06F 21/31; G06F 21/62; G06F 2221/2111; H04L 63/08; H04L 63/0876; H04L 63/126; H04L 51/00
USPC ......................................................... 726/7
See application file for complete search history.

(56) References Cited

U.S. PATENT DOCUMENTS 7,086,085 B1    8/2006   Brown et al.
8,793,777 B2 *  7/2014   Colson .................... G06F 21/34
                                                705/51

(Continued)

OTHER PUBLICATIONS

Marian Ventuneac; A Policy-Based Security Framework for Web-Enabled Applications; ACM-2003; p. 487-492.*

*Primary Examiner* — Monjour Rahim
(74) *Attorney, Agent, or Firm* — Law Office of Karen Dana Oster, LLC

(57) ABSTRACT

A system and associated methods for validating and managing user identities are disclosed. In at least one embodiment, a central computing system is configured for receiving and processing data related to an at least one user and associated identity. A user account is established and associated with each user, the account containing at least one of a unique account identifier, an identity score representing a quality rating of the user based on the at least one identity, and an identity table containing details related to the at least one identity. In at least one embodiment, the computing system is capable of selectively validating the at least one identity, dynamically calculating the identity score associated with the at least one user, and even leveraging select unique identifying data to create a persistent multi-factor authentication process in conjunction with a mobile device associated with the at least one user.

20 Claims, 6 Drawing Sheets

(56) References Cited

U.S. PATENT DOCUMENTS

| | | | |
|---|---|---|---|
| 8,925,059 B2* | 12/2014 | Mackler | G06F 21/31 709/227 |
| 2004/0003079 A1 | 1/2004 | Aiu et al. | |
| 2004/0111480 A1 | 6/2004 | Yue | |
| 2006/0224675 A1 | 10/2006 | Fox et al. | |
| 2007/0083600 A1 | 4/2007 | Bakos et al. | |
| 2010/0088753 A1 | 4/2010 | Ayres et al. | |
| 2011/0016534 A1 | 1/2011 | Jakobsson et al. | |
| 2013/0104216 A1* | 4/2013 | Dennis | G06F 21/6245 726/7 |
| 2013/0179955 A1* | 7/2013 | Bekker | H04L 63/0823 726/7 |
| 2013/0179988 A1* | 7/2013 | Bekker | H04L 63/0823 726/27 |
| 2014/0007179 A1 | 1/2014 | Moore | |
| 2014/0123264 A1* | 5/2014 | Shull | H04L 63/08 726/7 |
| 2014/0245385 A1* | 8/2014 | Singhal | H04L 63/126 726/3 |
| 2014/0298419 A1* | 10/2014 | Boubez | H04L 63/08 726/4 |
| 2014/0373104 A1* | 12/2014 | Gaddam | H04L 63/105 726/4 |
| 2015/0264023 A1* | 9/2015 | Reno | G06F 21/316 726/7 |
| 2015/0295906 A1* | 10/2015 | Ufford | H04L 63/0807 726/6 |
| 2016/0182418 A1* | 6/2016 | Gupta | H04L 51/12 709/206 |

\* cited by examiner

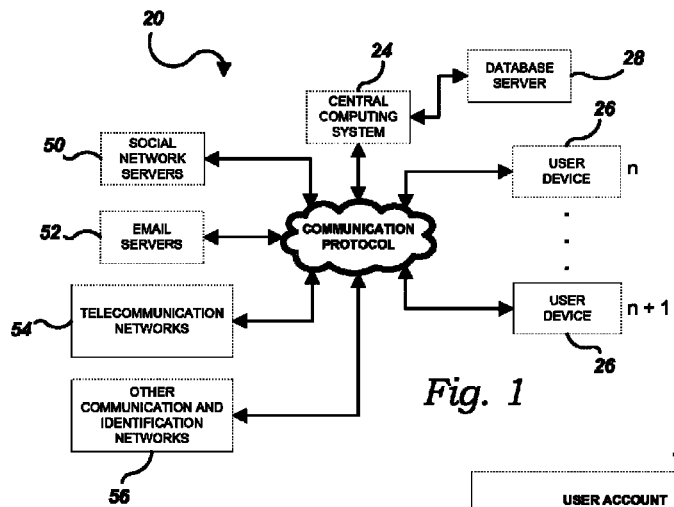
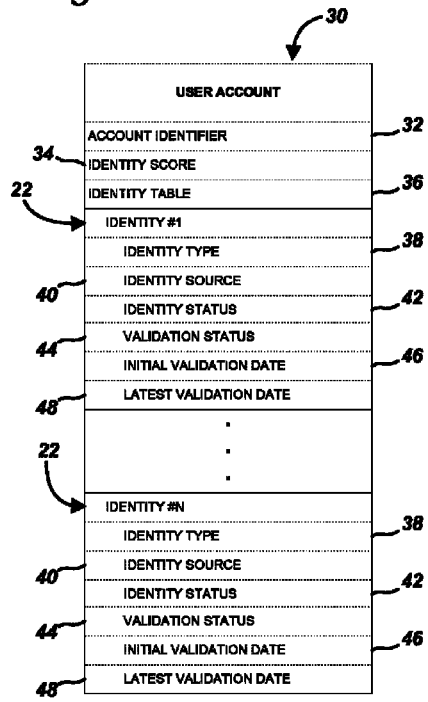
Fig. 1
Fig. 2

SYSTEM AND METHODS FOR VALIDATING AND MANAGING USER IDENTITIES

RELATED APPLICATIONS

This application claims priority and is entitled to the filing date of U.S. provisional application Ser. No. 62/020,878, filed on Jul. 3, 2014 and entitled "System and Methods for Validating and Managing User Identities." The contents of the aforementioned application are incorporated by reference herein.

BACKGROUND

The subject of this provisional patent application relates generally to digital security, and more particularly to a system and associated methods for validating and managing user identities.

By way of some background, the proliferation of e-commerce and Internet-based communications generally has facilitated the growth and pervasiveness of identity theft and identity spoofing. Positive authentication of a person's identity in a disconnected environment such as the Internet has proven difficult. Furthermore, the risks of doing business with unauthorized or incorrectly identified persons in an online environment can result in financial loss and reputation damage through fraud, disclosure of customer information, corruption of data, or unenforceable agreements.

For example, when it comes to online transactions via the Internet, businesses have historically had no choice but to rely upon the accuracy of the information provided to them by consumers. Given the relative anonymity that is afforded by the Internet, along with the relative ease with which one may create a fake persona (including a fake email address), this has proven to be a fundamental flaw in the security of the Internet that is being exploited by cyber criminals countless times every day. This weakness enables criminals to use stolen credit card numbers to purchase products from online retailers, apply for new credit cards and loans in someone else's name, and redirect another person's sensitive financial information to themselves. These security flaws arise primarily because confirmations, receipts, and notices are sent to the fake email address provided by whomever initiates a given transaction, rather than the email address of the person whose information is being fraudulently used. The actual consumer remains unaware that he or she has been victimized until long after the fact.

As another example, online predators and cyber-stalkers often use fake email addresses, social media ID's and user aliases as masks to cover their true identities. Cloaked in anonymity, they are able to register on dating and social media websites in order to locate their victims and perpetrate serious violent and non-violent crimes. As a result, website owners have found themselves embroiled in lawsuits brought against them by victims and their families for failing to do more to protect their members.

As yet another example, another common ploy by cyber criminals is known as "phishing." This is when a fake email message is created that has the appearance—with recognizable graphics, fonts, language—of a legitimate message but is designed to get the user to click on an embedded link. This often results in the infection of the user's device, and opens that user to a number of scenarios like key logging, password lifting, and the downloading of malware onto the user's device. This is possible because the header of an email message is easily tampered with so as to appear to be originating from a trusted source.

Thus, there remains a need for a system and associated methods for effectively validating and managing user identities. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a system and associated methods for validating and managing user identities. In at least one embodiment, a central computing system is configured for receiving and processing data related to an at least one user and associated identity. Using a computing device in communication with the computing system, a user account is established and associated with each user. The user account contains at least one of a unique account identifier, an identity score representing a quality rating of the user based on the at least one identity associated therewith, and an identity table containing at least one of an identity type, an identity source, an identity status, a validation status, an initial validation date, and a latest validation date. The computing system selectively validates the at least one identity through interacting with the associated identity source so as to determine whether the identity actually originates from the identity source. The computing system also dynamically calculates the identity score associated with the at least one user, the identity score being based on at least one of the number identities associated with the user, the identity type associated with each identity, the amount of time that has passed since the initial validation date associated with each identity, and the amount of time that has passed since the latest validation date associated with each identity. As such, the higher the identity score is for a given user, the more the at least one identity associated with that user can be trusted by other users.

A primary objective inherent in the above described system and methods of use is to provide advantages not taught by the prior art.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is a simplified schematic view of an exemplary system for validating and managing user identities, in accordance with at least one embodiment;

FIG. 2 is an architecture diagram of an exemplary user identity table, in accordance with at least one embodiment;

Figure 3:
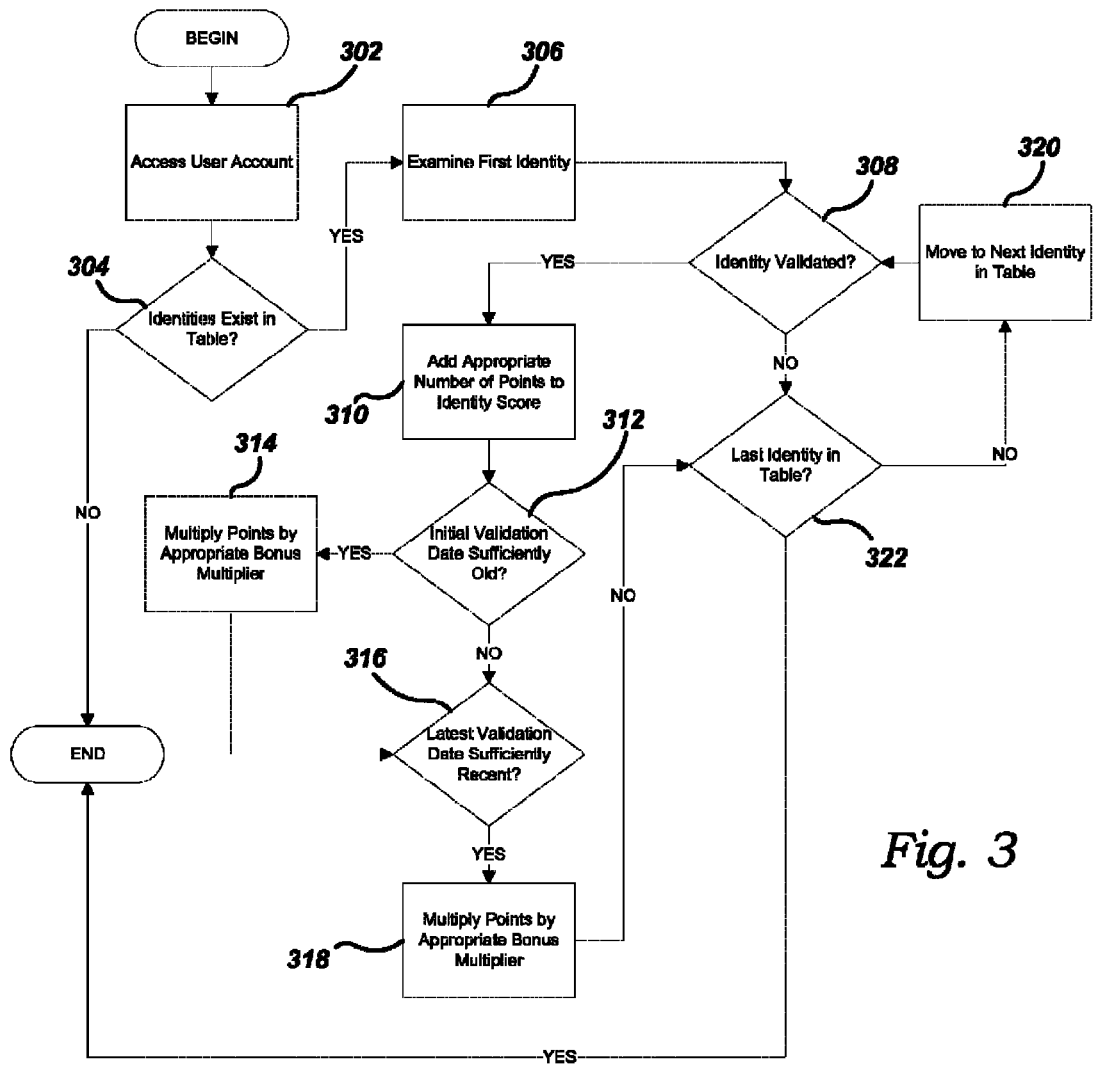
FIG. 3 is a flow diagram of an exemplary method for validating and managing user identities, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Turning now to FIG. 1, there is shown a simplified schematic view of an exemplary system 20 for validating and managing an at least one identity 22 of an at least one user, in accordance with at least one embodiment. The system 20 provides, in at least one embodiment, a central computing system 24 configured for receiving and processing data related to the at least one user and associated identity 22, and an at least one user device 26 in selective communication with the computing system 24. Additionally, in at least one embodiment, a database server 28 is in communication with the computing system 24 and configured for selectively storing said data related to the at least one user and associated identity 22. In at least one embodiment, the computing system 24 and database server 28 are one and the same—as such, it is intended that those terms as used herein are to be interchangeable with one another. In at least one embodiment, the computing system 24 and database server 28 are omitted, such that the system 20 and associated methods described herein are implemented through the at least one user device 26.

At the outset, it should be noted that communication between each of the computing system 24, at least one user device 26, and database server 28 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the term "user device" is intended to include any type of computing device now known or later developed, such as desktop computers, mobile phones, smartphones, laptop computers, tablet computers, personal data assistants, gaming devices, point of sale ("POS") systems, access control devices, wearable devices, etc.

With continued reference to FIG. 1, in the exemplary embodiment, the computing system 24 contains the hardware and software necessary to carry out the exemplary methods for validating and managing user identities 22 as described herein. Furthermore, in at least one embodiment, the computing system 24 comprises a plurality of computing devices selectively working in concert with one another to carry out the exemplary methods for validating and managing user identities 22 as described herein. In at least one embodiment, each user device 26 provides a user application residing locally in memory on the user device 26, the user application being configured for communicating with the computing system 24 for validating and managing the at least one user identity 22, among other functions described herein. It should be noted that the term "memory" is intended to include any type of electronic storage medium (or combination of storage mediums) now known or later developed, such as local hard drives, RAM, flash memory, external storage devices, network or cloud storage devices, etc. Furthermore, the various components of each user device 26 may reside in memory on a single computing device, or may separately reside on two or more computing devices in communication with one another. In another embodiment, rather than the user application residing locally in memory on each user device 26, the user application instead resides remotely in memory on the computing system 24 and/or database server 28, with each user device 26 communicating with the user application via a portal hosted by the computing system 24 and/or database server 28.

The at least one user device 26 is in the possession of a user of the system 20 who is desirous of verifying whether a given identity 22 is actually associated with a particular other user of the system 20—i.e., desirous of validating the user identity 22—said other user in possession of another one of the at least one user device 26 in at least one embodiment. It should be noted that the term "identity" is intended to include any type of identification, now known or later developed, that is associated with a given user as a means for identifying that user, such as an email address, instant messenger username, social network username, phone number, mailing address, banking username, etc.

In at least one embodiment, as illustrated in the architecture diagram of FIG. 2, the computing system 24 stores and manages a user account 30 for each user containing various details related to the user and each associated identity 22 for which the user elects to disclose to the computing system 24. In at least one embodiment, each user account 30 contains at least one of a unique account identifier 32, an identity score 34, and an identity table 36. As discussed further below, the identity score 34 is a numerical value that is dynamically calculated by the computing system 24 in real-time so as to derive a quality rating of the user based on the associated identities 22. The identity table 36 contains details related to each associated identity 22. In at least one embodiment, for each identity 22, the identity table 36 contains at least one of an identity type 38, an identity source 40, an identity status 42, a validation status 44, an initial validation date 46, and a latest validation date 48. In a bit more detail, the identity type 38 indicates the type of identity 22—i.e., email address, instant messenger username, social network username, phone number, mailing address, banking username, etc. The identity source 40 indicates the source from which the identity 22 originates and through which the identity 22 is controlled and managed—i.e., Gmail®, Yahoo!®, Facebook®, Twitter®, LinkedIn®, AT&T®, Verizon®, Bank of America®, Paypal®, OneID®, OpenID®, etc. The identity status 42 indicates whether the identity 22 is currently online (available) or offline (unavailable). The validation status 44 indicates whether or not the identity 22 has been validated by the computing system 24, as discussed further below. The initial validation date 46 indicates the date the identity 22 was first validated by the computing system 24, and the latest validation date 48 indicates the date the identity 22 was last re-validated by the computing system 24, if ever. It should be noted that, in at least one embodiment, each identity 22 is stored as a one-way hash token; thus, should a particular user account 30 be hacked, or should communications to a particular identity 22 be intercepted, the unauthorized party would not be able to discern the actual identities 22 contained therein.

In at least one embodiment, the term "validation" is intended to mean that the computing system 24 has sufficiently interacted with the purported identity source 40 so as to conclude that the identity 22 does in fact originate from the identity source 40 and is therefore a valid identity 22. Accordingly, in at least one embodiment and as illustrated in the simplified schematic view of FIG. 1, the computing system 24 is in selective communication with one or more of a social network server 50, an email server 52, a telecommunication network 54, or any other type of communication or identification network 56 now known or later developed, associated with a given identity source 40. The methods employed by the computing system 24 for validating a given identity 22 depends on the identity type 38 and identity source 40. For example, where the identity type 38 is an email address, the computing system 24 may send a validation email to the email address through which the user is able to complete a pre-defined validation step (i.e., click a hyperlink, reply to the validation email, etc.). Where the identity type 38 is a phone number, the computing system 24 may send an SMS message or audio recording containing a validation code which the user must then relay back to the computing system 24. Where the identity type 38 is an instant messenger username or a social network username, the computing system 24 may send a validation message to the username via the messaging functionality provided by the identity source 40, through which the user is able to complete a pre-defined validation step. Thus, it should be appreciated that the above validation methods are merely illustrative, and that any other methods for validating a given identity 22, now known or later developed, may be substituted.

As mentioned above, in at least one embodiment, the identity score 34 is a numerical value that is dynamically calculated by the computing system 24 in real-time so as to derive a quality rating of the user based on the associated identities 22. In other words, in at least one such embodiment, the identity score 34 is similar to a credit score in that it provides a standardized, relative and absolute score in points based on the associated identities 22. In a bit more detail, in at least one embodiment, the computing system 24 adds points to the identity score 34 based on at least one of the number and types of validated identities 22, the amount of time that has passed since the initial validation date 46 of each identity 22, and the amount of time that has passed since the latest validation date 48 of each identity 22.

In at least one embodiment, as illustrated in the flow diagram of FIG. 3, the method of dynamically calculating the identity score 34 for a given user entails the steps of first accessing the associated user account 30 (302). Should the identity table 36 of the user account 30 contain at least one identity 22 (304), the first identity 22 in the identity table 36 is examined (306). If the computing system 24 determines that the identity 22 has been validated (308), an appropriate number of points are added to the identity score 34 (310). For example, in at least one embodiment, if the validated identity type 38 is an email address, the computing system 24 adds ten points to the identity score 34; if the validated identity type 38 is a phone number, the computing system 24 adds twenty points to the identity score 34; and if the validated identity type 38 is an instant messenger or social network username, the computing system 24 adds twenty points to the identity score 34. In a still further embodiment, a different number of points may be added for different types of email addresses, depending on the relative reliability of a given email address type—for example, relatively more points could be added in connection with relatively more reliable email address types having controlling/administrative entities, such as corporate and educational email addresses, as compared to potentially less reliable email address types, such as personal email addresses. These point amounts are merely exemplary and intended to simply illustrate the exemplary method described herein. Next, if the computing system 24 determines that the initial validation date 46 of the identity 22 is sufficiently old (312), the points are multiplied by an appropriate bonus multiplier (314)—effectively rewarding the user for having a relatively old validated identity 22. For example, in at least one embodiment, if the initial validation date 46 is over one month old, the computing system 24 uses a bonus multiplier of ten percent (10%); if the initial validation date 46 is over three months old, the computing system 24 uses a bonus multiplier of twenty percent (20%); and if the initial validation date 46 is over six months old, the computing system 24 uses a bonus multiplier of thirty percent (30%). These initial validation date 46 milestones and associated bonus multiplier amounts are merely exemplary and intended to simply illustrate the exemplary method described herein. Next, if the computing system 24 determines that the latest validation date 48 of the identity 22 is sufficiently recent (316), the points are multiplied by another appropriate bonus multiplier (318)—effectively rewarding the user for re-validating a given identity 22. For example, in at least one embodiment, if the latest validation date 48 is less than six months old, the computing system 24 uses a bonus multiplier of ten percent (10%); if the latest validation date 48 is less than three months old, the computing system 24 uses a bonus multiplier of twenty percent (20%); and if the latest validation date 48 is less than one month old, the computing system 24 uses a bonus multiplier of thirty percent (30%). These latest validation date 48 milestones and associated bonus multiplier amounts are merely exemplary and intended to simply illustrate the exemplary method described herein. This process of analyzing each identity 22 in the identity table 36 (320) and adjusting the identity score 34 accordingly continues until the last identity 22 is reached and analyzed (322). Additionally, this process is automatically repeated by the computing system 24 periodically and/or upon the data contained in the identity table 36 being modified so as to maintain an accurate, real-time identity score 34 for each user. It should be noted that the above described method for dynamically calculating the identity score 34 is merely illustrative. As such, any other methods for dynamically calculating the identity score 34, now known or later developed, may be substituted. Thus, the more validated identities 22 a given user has, the greater the identity score 34 becomes for that user. Additionally, the older and more frequently each of those identities 22 are validated, the greater still the identity score 34 becomes. In other words, the identity score 34 has a direct correlation with the trustworthiness of user's identities 22 and, thus, the user. The higher the identity score 34 is for a given user, the more their associated identities 22 can be trusted.

Relatedly, because the user account 30 for a given user is capable of managing and tracking a number of identities 22 associated with that user, the system 20 is capable of reducing "bad acts" and limiting "bad actors." In a bit more detail, in at least one embodiment, upon receiving a complaint about a particular identity 22 being managed by the computing system 24, the computing system 24 may take appropriate action against the associated user depending on the severity of the alleged bad act, including but not limited to issuing a warning to the user, reducing the user's identity score 34 by an appropriate amount, suspending one or more of the identities 22 associated with the user account 30, banning or blacklisting one or more of the identities 22 associated with the user account 30, etc. Additionally, because the computing system 24 manages an identity table 36 for each user, with each identity table 36 containing one or more identities 22 associated with said user, the system 20 makes it very difficult for others to spoof or otherwise impersonate one of a user's identities 22, since the computing system 24 validates the identities 22, as discussed above.

Furthermore, because the system 20 provides an identity score 34 for each user, the system 20 is able to provide third parties (including other users) verification as to the validity and/or level of trustworthiness of a given identity 22 without actually having disclose any personal details of the user associated with that identity 22. In other words, in at least one embodiment, the system 20 accommodates the potential for managing highly rated anonymous identities 22.

Based on the above description, it should be understood that the system 20 may be utilized in a variety of contexts, wherever there is a need or desire to validate and/or manage user identities 22. By way of example, one such context is in connection with an email system so as to allow the user to determine the validity of another user's email address before sending an email to, or receiving an email from, that email address.

Figure 4:
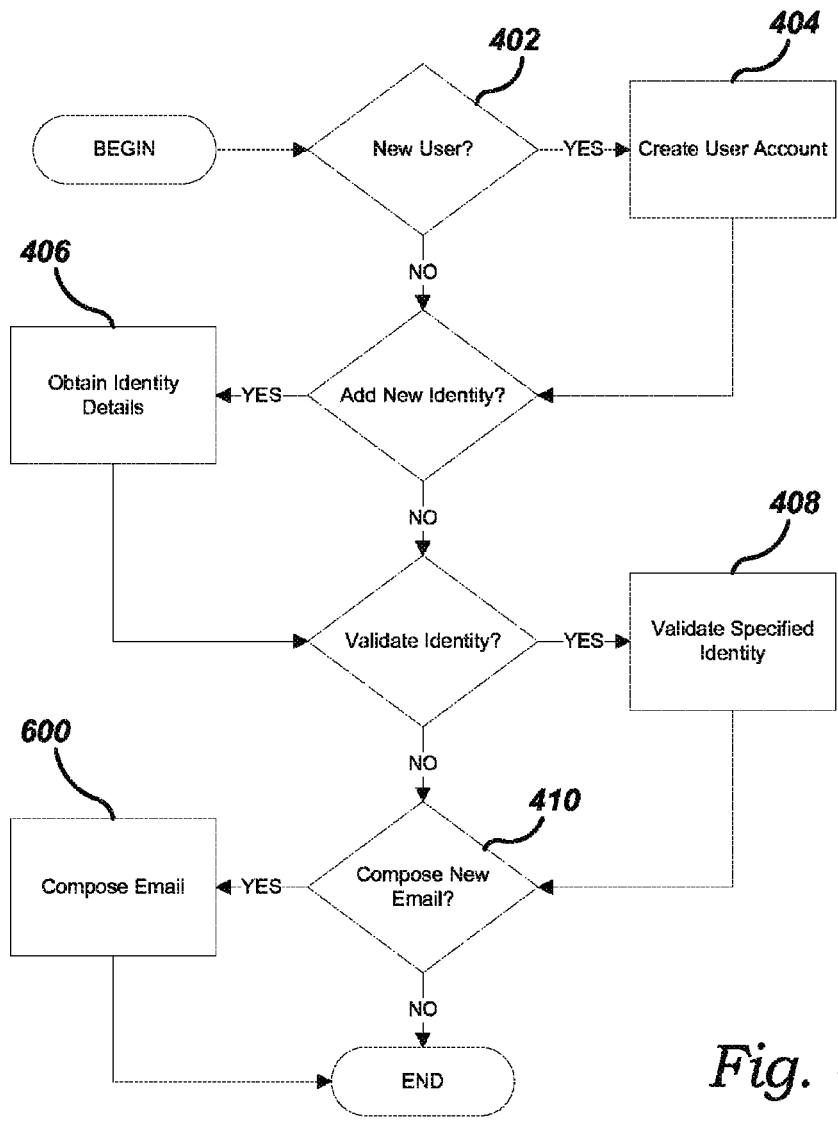
FIG. 4 is a flow diagram of an exemplary method for validating and managing user identities in an email system, in accordance with at least one embodiment.
Figure 5:
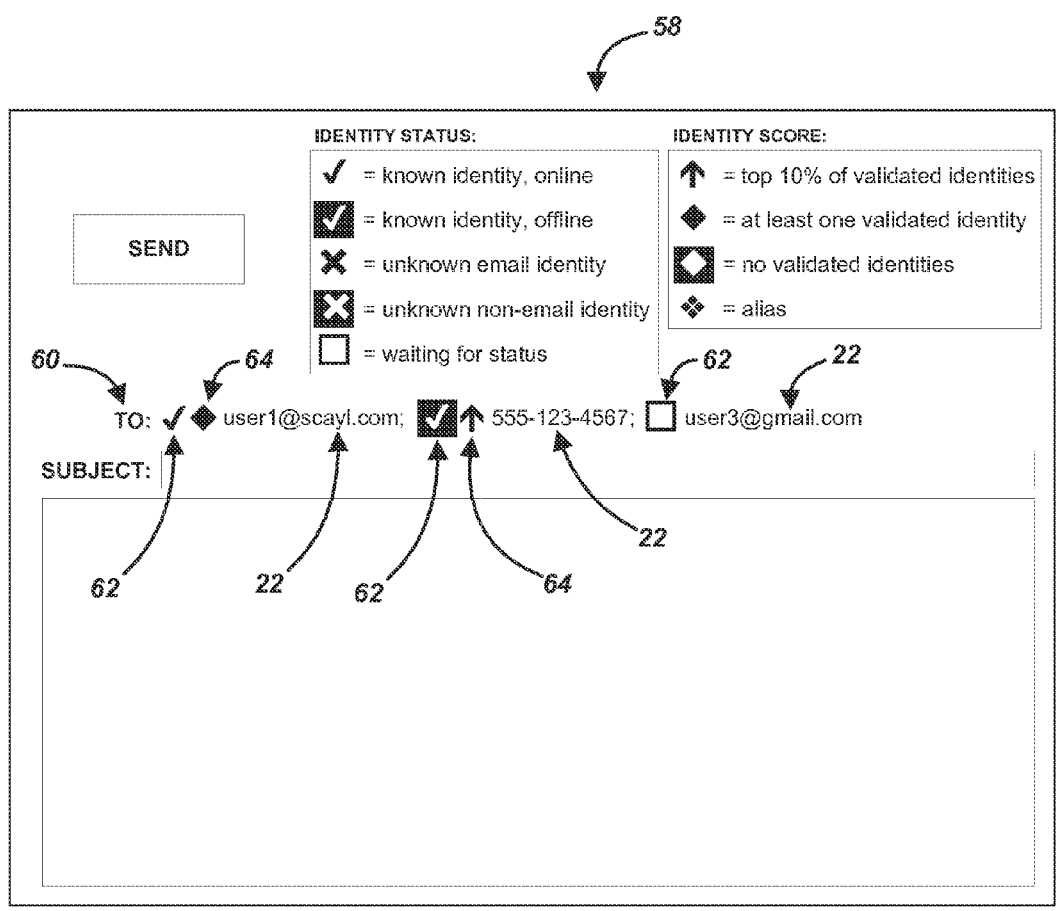
FIG. 5 is an illustration an exemplary user interface as displayed by an exemplary computing device, in accordance with at least one embodiment.

In at least one such embodiment, as illustrated in the flow diagram of FIG. 4, through the user application residing either locally on the user device 26 or remotely on the computing system 24 and/or database server 28, upon a first user accessing the user application, the computing system 24 first determines whether the first user is new to the system 20 (402). If the first user is new, the first user is required to properly register with the computing system 24 via the user device 26 (404). The first user is also given the ability to disclose (406) and validate (408) one or more identities 22 associated with the first user. Once the first user has registered with the computing system 24, and upon the first user desiring to send an email to an identity 22 of a further user (410), the user application provides the first user access to an email interface 58 as displayed on the user device 26 (600). An illustration of an exemplary such email interface 58 is shown in FIG. 5. From the email interface 58, the first user is able to send and receive emails, among other possible functionality. Referring now to the flow diagram of FIG. 6, in at least one embodiment, upon the first user desiring to send an email to an identity 22 of the further user (600), the first user inputs the identity 22 of the further user in a recipient field 60 of the email interface 58 (602), at which point the computing system 24 (or the user application in cooperation with the computing system 24) analyzes the input identity 22 to determine whether or not the identity 22 is a known identity 22 (604)—i.e., whether the identity 22 currently resides in an identity table 36 of a user account 30. If it is determined that the identity 22 is known, the computing system 24 next displays on the email interface 58 an appropriate notification regarding the identity status 42 associated with the identity 22 (606)—i.e., whether the identity 22 is online or offline. In the exemplary embodiment, the notification entails a status icon 62 positioned adjacent the identity 22 in the recipient field 60. However, in further embodiments, the notification can take on any other form now known or later conceived. Additionally, if it is determined that the identity 22 is known, the computing system 24 displays an appropriate notification on the email interface 58 to indicate the identity score 34 associated with the further user (608). In at least one embodiment, the notification entails a score icon 64 positioned adjacent the identity 22 in the recipient field 60. However, in further embodiments, the notification can take on any other form now known or later conceived, such as the actual numerical identity score 34 for example. As such, in at least one embodiment, the first user is provided with information both as to the identity status 42 of the identity 22 to which the email is to be sent, as well as the identity score 34 (i.e., level of trustworthiness) of that 22 identity, before the email is actually sent.

If it is determined that the identity 22 is not a known identity 22, the computing system 24 sends a message to the identity 22, via the messaging functionality provided by the identity source 40 from which the identity 22 originates, to notify the associated further user about the email from the first user and inviting the further user to register with the system 20 in order to validate the identity 22 (610). Additionally, an appropriate notification is displayed on the email interface 58 (612), such as the status icon 62 adjacent the identity 22 in the exemplary email interface 58.

Figure 6:
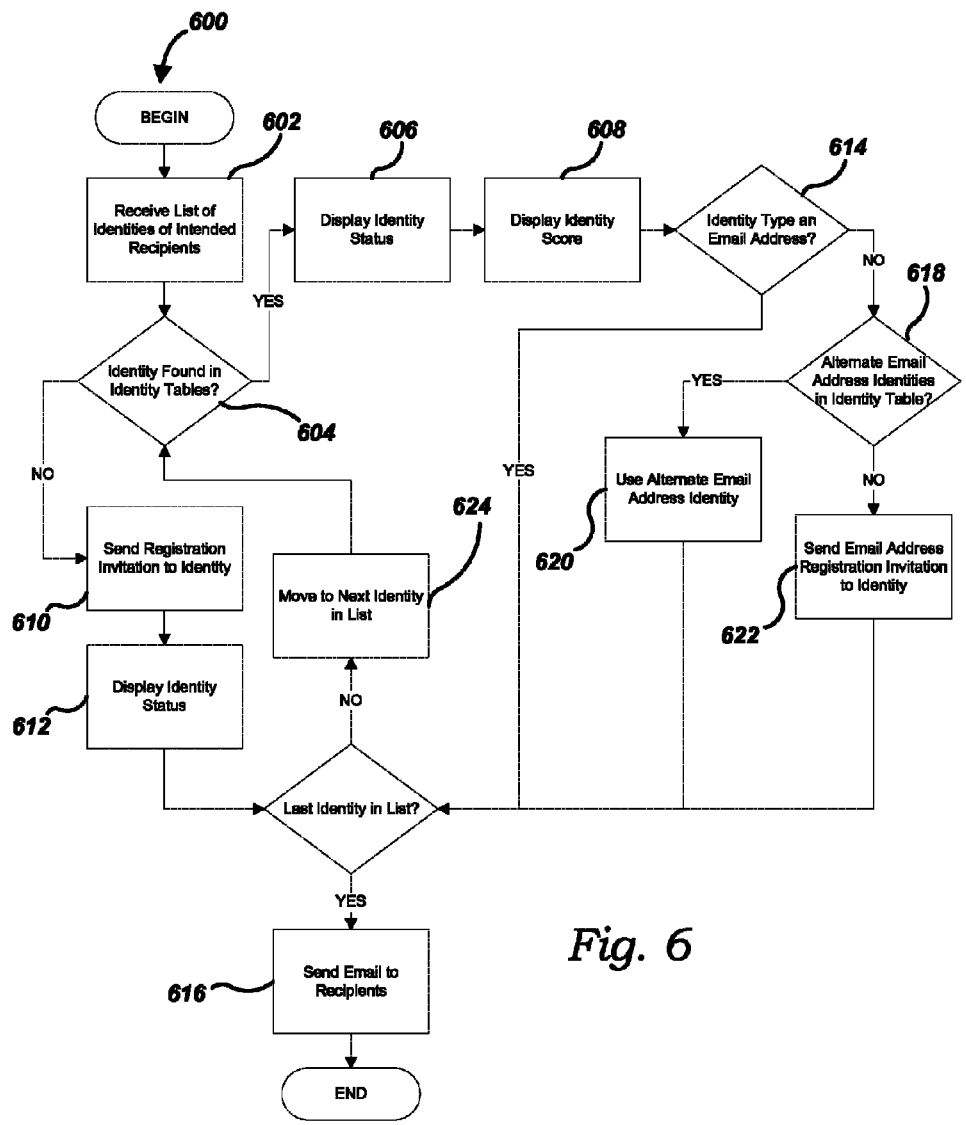
FIG. 6 is a further flow diagram of an exemplary method for validating and managing user identities in an email system, in accordance with at least one embodiment.

In at least one embodiment, with continued reference to FIG. 6, the computing system 24 next determines whether the identity type 38 of the known identity 22 is an email address (614). If the identity type 38 is an email address, the email is sent to the specified identity 22 (616). If the identity type 38 is not an email address, as illustrated in FIG. 5, the computing system 24 checks the identity table 36 associated with the specified identity 22 to determine whether an alternate identity 22 exists in the identity table 36 having an email address identity type 38 (618). If an alternate identity 22 having an email address identity type 38 is found, the email is sent to the alternate identity 22 (620). In at least one embodiment, if more than one alternate identity 22 is found having an email address identity type 38, the email is sent to the alternate identity 22 having the highest identity score 34. In another such embodiment, if more than one alternate identity 22 is found having an email address identity type 38, the email is sent to each of the alternate identities 22. If no such alternate identity 22 having an email address identity type 38 can be found in the associated identity table 36, the computing system 24 sends a message to the specified identity 22, via the messaging functionality provided by the identity source 40 from which the identity 22 originates, to notify the associated further user about the email from the first user and inviting the further user to register an email address identity type 38 with the system 20 (622).

As illustrated in FIG. 5, in at least one embodiment, the first user is able to send emails to multiple identities 22 at once, similar to a traditional email system. In such instances, the steps of the above described method are carried out for each identity 22 (624).

Because the computing system 24 effectively unifies multiple identities 22 by virtue of the identity table 36 for each user, sending an email to any of the identities 22 associated with a given user will ensure that the email will reach that user, as described above—even if the recipient user's actual email address is unknown to the sender of the email. As such, in at least one embodiment, users are able to keep their email addresses private while still providing other users with the ability to send emails to them, so long as those email addresses are stored in the respective users' identity tables 36.

As mentioned above, in at least one embodiment, each identity 22 is stored as a one-way hash token, such that actual email addresses (and other identity types 38) are not stored in the identity tables 38 but rather only the one-way hash values; thus, should a particular user account 30 be hacked, or should an email to a particular identity 22 be intercepted, the unauthorized party would not be able to discern the actual identities 22 contained therein. In other words, the interceptor would not be able to determine from whom the email originated or to whom it was directed. In still further embodiments, any other means or methods of data obfuscation may be substituted.

It should be noted that while the above example is discussed in the context of transmitting a message via email, the above-described steps could be carried out in the context of any other messaging protocol, now known or later developed, including, for example, peer-to-peer file transfer protocols.

Another example of a specific context in which the system 20 might be utilized is with respect to the review and approval of users in connection with various Internet-based accounts and/or services, including but not limited to email accounts, social network accounts, etc. For example, a website offering email services might use the system 20 to obtain a particular user's identity score 34 in order to determine the relative trustworthiness of that user. If a user's identity score 34 is too low, the website might decline the user's request for an email account. Additionally, the website might provide the user with an email account having a certain amount of storage space as dictated by the user's identity score 34—i.e., the higher the identity score 34, the greater the amount of storage space provided to the user at no charge or at a discounted rate.

Yet another example of a specific context in which the system 20 might be utilized is with respect to access control. In a bit more detail, in at least one such embodiment, the system 20 takes advantage of the fact that a user's mobile phone is one of the strongest (if not the strongest) proxy for, and verification of, the user's identity. This is primarily due to the fact that mobile phones are currently secured biometrically (i.e., fingerprint, retina, etc.) and/or with a passcode. Furthermore, as discussed above, not only may the user device 26 be a mobile phone, but the phone number associated with a user's mobile phone may also be one of the identity types 38 that are stored in the user's identity table 36. Thus, in at least one embodiment, the system 20 provides the user with the ability to selectively designate a given message (i.e., an email, direct message, or any other form of electronic communication, now known or later developed) as "private," which effectively limits access to the message to only the intended receiving users who can be properly authenticated. For example, in at least one such embodiment, the interface provided by the user application provides a checkbox that the sending user may check if they wish for the message to be treated as "private." In short, in at least one embodiment, a message that is designated as "private" can only be accessed by a receiving user if (a) the receiving user attempts to access the message using a mobile phone that is registered with the system 20, or (b) the receiving user attempts to access the message using another one of the receiving user's user devices 26 and that user device 26 is within sufficient proximity to the receiving user's mobile phone that is registered with the system 20, as discussed further below. Given that mobile phones tend to be carried on a user's person, or at least kept in relatively close proximity to a user's person, if a particular user device 26 is in sufficiently close proximity to the registered mobile phone, it can be assumed that the user is in control of the user device 26. In at least one embodiment, a mobile phone that is associated with the user account 30 of the receiving user, as discussed above, is deemed to be "registered" with the system 20 for the purpose of this functionality. In at least one alternate embodiment, a mobile phone is registered with the system 20 by installing the user application on the mobile phone and logging into the computing system 24 using the user account 30 credentials (or registering a new user account 30 with the computing system 24 via the mobile phone).

Figure 7:
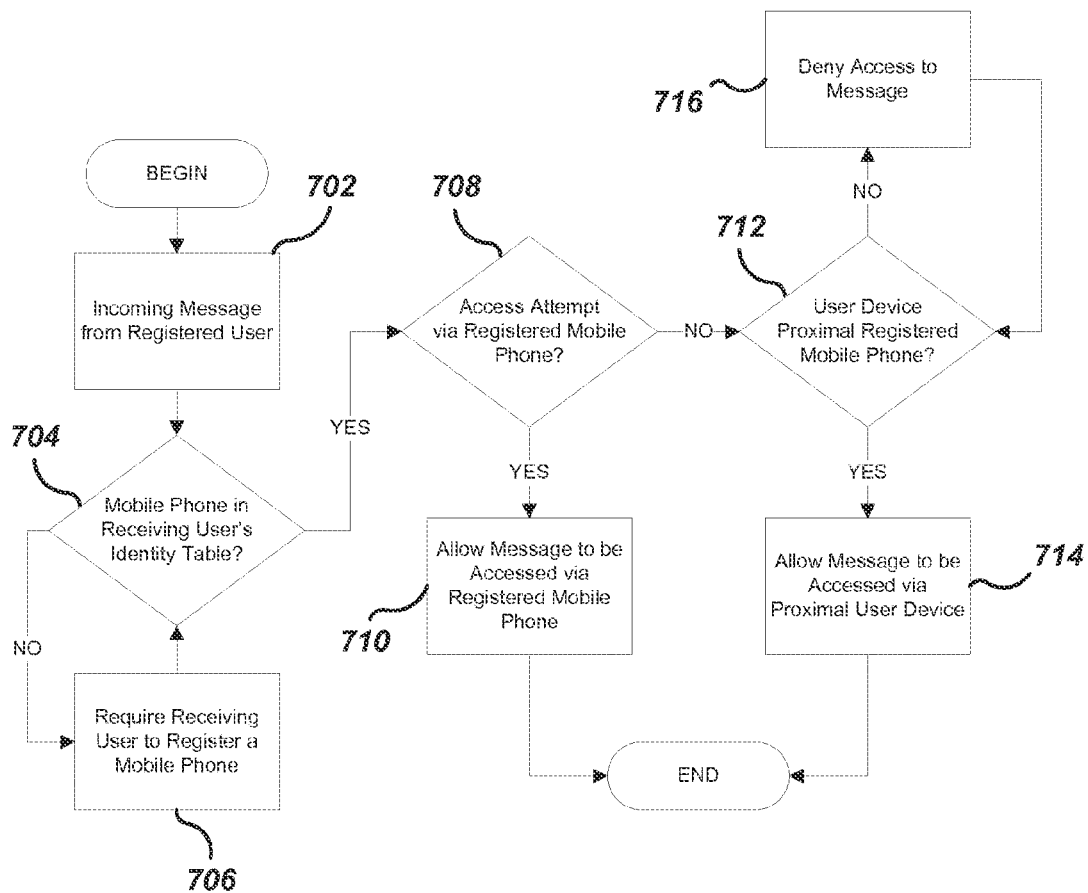
FIG. 7 is a flow diagram of an exemplary method for facilitating the transmission of a private communication between users, in accordance with at least one embodiment.

In a bit more detail, as illustrated in the flow diagram of FIG. 7, through the user application residing either locally on the user device 26 or remotely on the computing system 24 and/or database server 28, upon a registered user (hereinafter referred to as a "receiving user") receiving an incoming message from another registered user (hereinafter referred to as a "sending user") (702), it is first determined whether the receiving user has a mobile phone registered with the system 20 (704). If the receiving user does not have a mobile phone registered with the system 20, the receiving user is required to register a mobile phone (706). In at least one embodiment, the mobile phone is registered by adding the associated mobile phone number as a new identity 22, in connection with the user account 30 associated with the receiving user, and validating the identity 22 as discussed above. Additionally, in at least one embodiment, upon registering a mobile phone with the system 20, a unique personal identification function is created and stored in memory on the mobile phone; the personal identification function containing identifying data that is unique to the associated user and used for authenticating the user, as discussed further below. If the receiving user refuses to register a mobile phone with the system 20, the receiving user is prevented from accessing the incoming message. If the receiving user does have a mobile phone registered with the system 20, it is next determined whether the receiving user is attempting to access the incoming message using the registered mobile phone (708)—either by virtue of the message being transmitted directly to the receiving user's mobile phone, or the receiving user simply using their mobile phone to access the account (or user device 26) to where the message was directed (such as a webmail account, for example). If so, the receiving user is allowed to access the incoming message through the registered mobile phone (710). Otherwise, if the receiving user is attempting to access the incoming message using another one of the user devices 26 associated with the receiving user, it is determined whether the user device 26 to which the message is directed (or the user device 26 through which the receiving user is attempting to access the incoming message) is within sufficient proximity to the receiving user's registered mobile phone (712). As mentioned above, in at least one embodiment, the unique personal identification function is stored in memory as part of the user application on the mobile phone and contains identifying data that is unique to the associated user. In at least one such embodiment, the personal identification function contains at least one of the user account 30 login credentials and a unique identifier associated with the mobile phone—such as the MAC address or IEMI number of the mobile phone, for example. Upon a receiving user attempting to access the incoming message through a user device 26 other than the registered mobile phone, the personal identification function of the user application on the mobile phone must communicate with the user application on the user device 26 to essentially confirm the authenticity of the associated user before access to the message is allowed—hence why the user device 26 must be in sufficient proximity to the registered mobile phone. In at least one embodiment, the personal identification function transmits the identifying data to the user application on the user device 26, such that the user device 26 is able to automatically detect the presence of the mobile phone and match it with the expected parameters. Thus, the personal identification function is capable of leveraging select unique identifying data to create a persistent multi-factor authentication process in conjunction with the associated mobile phone. In at least one such embodiment, the personal identification function on the mobile phone communicates with the user application on the user device 26 via a secure Bluetooth connection. In still further such embodiments, the personal identification function on the mobile phone may use any other wired- or wireless-based communication protocol (or combination of protocols) now known or later developed. For this reason, sufficient proximity is dictated, at least in part, by the range of the communication protocol (or protocols) that are used to enable communication between the mobile phone and the user device 26. Thus, if the user device 26 is within sufficient proximity to the receiving user's registered mobile phone, the receiving user is allowed to access the incoming message through the proximally located user device 26 (714). Otherwise, the receiving user is notified that access will not be granted unless and until the user device 26 is sufficiently proximal to the receiving user's registered mobile phone (716). In at least one embodiment, the receiving user is required to enter a passcode on the mobile phone before they are able to access the incoming message. It should be noted that while the above example is discussed in the context of mobile phones, the same method may be carried out using any other mobile devices now known or later developed— such as tablet computers or wearable devices, for example— capable of being properly registered with the system 20, storing the personal encryption key, and communicating with other remote user devices 26 in sufficient proximity therewith.

In at least one embodiment, the system 20 may be utilized to provide further access control mechanisms to allow the sending user to selectively place desired limitations on the receiving users' ability to access the message. In at least one such embodiment, similar to the above described "private" message functionality, such limitations may be provided as a set of checkboxes via the interface provided by the user application. In at least one embodiment, one such access limitation is the ability to make a given message "read-only." In a bit more detail, in at least one such embodiment, a message that is designated as "read-only" remains encrypted and is displayed on the receiving user's user device 26 via a message display application capable of decrypting the message; the message display application residing either locally in memory on the user device (i.e., embedded in the user application, or residing in memory as a standalone application, etc.) or remotely on the computing system 24 and/or database server 28. The message display application preferably contains a selection of document readers, image renderers and video players for reading and displaying various types of content that might be contained in a given message. Because the message remains encrypted, the receiving user (or anyone who might intercept the message) is unable to view the message without the assistance of the message display application. Furthermore, in at least one embodiment, the message display application is required to obtain authorization from the central computing system 24 prior to displaying the message on the user device 26, so as to ensure that the user associated with the user device 26 is authorized to view the message. Additionally, in at least one embodiment, upon encountering a message designated as "read-only," the message display application prevents the user from forwarding or otherwise sending the message to anyone else.

In at least one embodiment, in addition to limiting the viewing of messages to specific users and/or user devices 26, the system 20 also provides further access limitations that a sending user may selectively apply to a given message. One such access limitation allows the sending user to specify a particular timeframe (or relative time limits) during which the message may be accessed/viewed by the receiving user. Another access limitation allows the sending user to specify a particular geographic region in which the message may be accessed/viewed by the receiving user. Another access limitation allows the sending user to limit the number of times which the receiving user may access/view the message. Another access limitation allows the sending user to create a challenge-response question to be posed to the receiving user, which the receiving user must answer correctly before they are allowed to access/view the message. It should be noted that these particular access limitations are merely examples and are not meant to be an exhaustive list of possible access limitations that may be utilized by the system 20. In at least one embodiment, upon a given message falling outside of the designated access limitations set by the sending user (for example, upon the specified timeframe passing, or the user device 26 moving outside of the specified geographic region, or the number of message views exceeding the specified maximum, etc.), the message may be configured for auto-deletion. Additionally, in at least one embodiment, the system 20 allows the sending user to selectively revoke any messages after they have been sent, regardless of any other access limitations that might be placed on a given message. In at least one embodiment, the system 20 also maintains a secure transaction ledger of every message transmitted (but not the content), including any settings and/or limitations associated with each message. This lets the sending user revoke access to "private" and "read-only" messages at any time. Thus, information owners can control how their assets are used through their entire lifecycle.

Again, these examples are merely illustrative and are in no way intended to limit the scope of the present invention. Instead, the system 20 may be utilized in virtually any context where there is a need or desire to validate and/or manage user identities 22.

In closing, regarding the exemplary embodiments of the present invention as shown and described herein, it will be appreciated that a system and associated methods for validating and managing user identities are disclosed. Because the principles of the invention may be practiced in a number of configurations beyond those shown and described, it is to be understood that the invention is not in any way limited by the exemplary embodiments, but is generally directed to a system and associated methods for validating and managing user identities and is able to take numerous forms to do so without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Aspects of the present specification may also be described as follows:

1. A method for validating and managing an at least one identity of an at least one user, the method comprising the steps of: implementing a central computing system configured for receiving and processing data related to the at least one user and associated identity; using a computing device in communication with the computing system to set up a user account associated with a one of the at least one user, the user account containing at least one of a unique account identifier, an identity score representing a quality rating of the user based on the at least one identity associated therewith, and an identity table containing at least one of an identity type, an identity source, an identity status, a validation status, an initial validation date, and a latest validation date; selectively validating the at least one identity through interacting with the associated identity source so as to determine whether the identity actually originates from the identity source; dynamically calculating the identity score associated with the at least one user, said identity score based on at least one of the number identities associated with the user, the identity type associated with each identity, the amount of time that has passed since the initial validation date associated with each identity, and the amount of time that has passed since the latest validation date associated with each identity; whereby, the higher the identity score is for a given user, the more the at least one identity associated with that user can be trusted by other users.

2. The method according to embodiment 1, further comprising the step of implementing a database server in communication with the computing system and configured for selectively storing said data related to the at least one user and associated identity.

3. The method according to embodiments 1-2, further comprising the step of storing the data related to each of the at least one identity as a one-way hash token.

4. The method according to embodiments 1-3, further comprising the step of establishing communication between the computing system and at least one of a social network server, an email server, and a telecommunication network.

5. The method according to embodiments 1-4, wherein the step of dynamically calculating the identity score further comprises the steps of: accessing the user account associated with the user; and for each identity contained in the identity table of the user account: upon determining that said identity has been previously validated, adding a pre-determined amount of points to the identity score; upon determining that the initial validation date associated with said identity is sufficiently old, multiplying said points by a first pre-determined bonus multiplier; and upon determining that the latest validation date associated with said identity is sufficiently recent, multiplying said points by a second pre-determined bonus multiplier.

6. The method according to embodiments 1-5, further comprising the step of dynamically re-calculating the identity score associated with a given identity upon the data contained in the associated identity table being modified.

7. The method according to embodiments 1-6, further comprising the steps of, upon a first user desiring to send an email to an identity associated with a further user: providing the first user access to an email interface as displayed on the computing device; allowing the first user to input the identity associated with the further user into a recipient field of the email interface; upon determining that the identity associated with the further user currently resides in an identity table of a user account: upon determining that the identity is an email address, sending the email to said identity; upon determining that the identity is not an email address: checking the identity table associated with the further user for any alternate identities that are email addresses; upon locating at least one alternate identity that is an email address, sending the email to said at least one alternate identity; and upon locating no alternate identities that are email addresses, sending a message to said identity to notify the associated further user about the email from the first user and inviting the further user to add an email address identity to the associated user account; and upon determining that the identity associated with the further user does not currently reside in an identity table of a user account, sending a message to said identity to notify the associated further user about the email from the first user and inviting the further user to set up a user account.

8. The method according to embodiments 1-7, further comprising the step of providing the first user with at least one of the identity status and identity score associated with the further user.

9. The method according to embodiments 1-8, wherein the step of providing the user with at least one of the identity status and identity score further comprises the steps of: displaying on the email interface an appropriate notification regarding the identity status associated with said identity; and displaying on the email interface an appropriate notification regarding the identity score associated with said identity.

10. The method according to embodiments 1-9, wherein the step of displaying on the email interface an appropriate notification regarding the identity status associated with said identity further comprises the step of displaying a status icon positioned adjacent the identity in the recipient field.

11. The method according to embodiments 1-10, wherein the step of displaying on the email interface an appropriate notification regarding the identity score associated with said identity further comprises the step of displaying a score icon positioned adjacent the identity in the recipient field.

12. The method according to embodiments 1-11, further comprising the step of, upon locating more than one alternate identity that is an email address, sending the email to the alternate identity having the highest identity score.

13. The method according to embodiments 1-12, further comprising the step of, upon locating more than one alternate identity that is an email address, sending the email each of the alternate identities.

14. The method according to embodiments 1-13, further comprising the steps of: allowing the first user to selectively designate the email as private; and upon the further user receiving and attempting to access the private email: upon determining that the further user does not have a mobile phone associated with the user account of the further user, requiring the further user to associate a mobile phone with the user account of the further user prior to allowing access to the email; upon determining that the further user is attempting to access the email using a mobile phone associated with the user account of the further user, providing access to the further user via the mobile phone; and upon determining that the further user is attempting to access the email using a computing device other than a mobile phone associated with the user account of the further user: upon determining that the computing device is within sufficient proximity to the mobile phone associated with the user account of the further user, providing access to the further user via the computing device.

15. The method according to embodiments 1-14, wherein the step of requiring the further user to associate a mobile phone with the user account of the further user further comprises the steps of: allowing the further user to add a phone number associated with the mobile phone as a new identity in connection with the user account associated with the further user; and validating said new identity.

16. The method according to embodiments 1-15, wherein the step of determining that the computing device is within sufficient proximity to the mobile phone associated with the user account of the further user further comprises the steps of: transmitting unique identifying data associated with at least one of the further user and mobile phone, stored in memory on the mobile phone, to the computing device; and the computing device automatically detecting the presence of the mobile phone by matching the mobile phone with expected parameters based on said identifying data.

17. The method according to embodiments 1-16, further comprising the steps of: allowing the first user to selectively designate the email as read-only; and upon the further user receiving and attempting to access the read-only email: verifying that the further user is authorized to access the read-only email; decrypting the read-only email; and displaying the contents of the read-only email using a message display application residing in memory on a computing device in the possession of the further user.

18. The method according to embodiments 1-17, further comprising the step of preventing the further user from forwarding or otherwise sending the read-only email to any other users.

19. A method for validating and managing an at least one identity of an at least one user, the method comprising the steps of: implementing a central computing system configured for receiving and processing data related to the at least one user and associated identity; using a computing device in communication with the computing system to set up a user account associated with a one of the at least one user, the user account containing at least one of a unique account identifier, an identity score representing a quality rating of the user based on the at least one identity associated therewith, and an identity table containing at least one of an identity type, an identity source, an identity status, a validation status, an initial validation date, and a latest validation date; selectively validating the at least one identity; dynamically calculating the identity score associated with the at least one user, wherein for each identity contained in the identity table of the user account associated with the user: upon determining that said identity has been previously validated, adding a pre-determined amount of points to the identity score; upon determining that the initial validation date associated with said identity is sufficiently old, multiplying said points by a first pre-determined bonus multiplier; and upon determining that the latest validation date associated with said identity is sufficiently recent, multiplying said points by a second pre-determined bonus multiplier;

whereby, the higher the identity score is for a given user, the more the at least one identity associated with that user can be trusted by other users.

20. A method for validating and managing an at least one identity of an at least one user, the method comprising the steps of: implementing a central computing system configured for receiving and processing data related to the at least one user and associated identity; using a computing device in communication with the computing system to set up a user account associated with a one of the at least one user, the user account containing an identity table containing the at least one identity; and upon a first user desiring to send an email to an identity associated with a further user: allowing the first user to specify the identity associated with the further user to which the email is to be sent; upon determining that the identity associated with the further user currently resides in an identity table of a user account: upon determining that the identity is an email address, sending the email to said identity; upon determining that the identity is not an email address: checking the identity table associated with the further user for any alternate identities that are email addresses; upon locating at least one alternate identity that is an email address, sending the email to said at least one alternate identity; and upon locating no alternate identities that are email addresses, sending a message to said identity to notify the associated further user about the email from the first user and inviting the further user to add an email address identity to the associated user account; and upon determining that the identity associated with the further user does not currently reside in an identity table of a user account: sending a message to said identity to notify the associated further user about the email from the first user and inviting the further user to set up a user account.

What is claimed is:

1. A method for validating and managing an at least one identity of an at least one user, the method comprising the steps of:
implementing a central computing system configured for receiving and processing data related to the at least one user and associated identity;
using a computing device in communication with the computing system to set up a user account associated with a one of the at least one user, the user account containing at least one of a unique account identifier, an identity score representing a quality rating of the user based on the at least one identity associated therewith, and an identity table containing at least one of an identity type, an identity source, an identity status, a validation status, an initial validation date, and a latest validation date;
selectively validating the at least one identity through interacting with the associated identity source so as to determine whether the identity actually originates from the identity source;
dynamically calculating the identity score associated with the at least one user, said identity score based on at least one of the number identities associated with the user, the identity type associated with each identity, the amount of time that has passed since the initial validation date associated with each identity, and the amount of time that has passed since the latest validation date associated with each identity;
whereby, the higher the identity score is for a given user, the more the at least one identity associated with that user can be trusted by other users.

2. The method of claim 1, further comprising the step of implementing a database server in communication with the computing system and configured for selectively storing said data related to the at least one user and associated identity.

3. The method of claim 1, further comprising the step of storing the data related to each of the at least one identity as a one-way hash token.

4. The method of claim 1, further comprising the step of establishing communication between the computing system and at least one of a social network server, an email server, and a telecommunication network.

5. The method of claim 1, wherein the step of dynamically calculating the identity score further comprises the steps of:
accessing the user account associated with the user; and
for each identity contained in the identity table of the user account:
upon determining that said identity has been previously validated, adding a pre-determined amount of points to the identity score;
upon determining that the initial validation date associated with said identity is sufficiently old, multiplying said points by a first pre-determined bonus multiplier; and
upon determining that the latest validation date associated with said identity is sufficiently recent, multiplying said points by a second pre-determined bonus multiplier.

6. The method of claim 5, further comprising the step of dynamically re-calculating the identity score associated with a given identity upon the data contained in the associated identity table being modified.

7. The method of claim 1, further comprising the steps of, upon a first user desiring to send an email to an identity associated with a further user:
providing the first user access to an email interface as displayed on the computing device;
allowing the first user to input the identity associated with the further user into a recipient field of the email interface;
upon determining that the identity associated with the further user currently resides in an identity table of a user account:
upon determining that the identity is an email address, sending the email to said identity;
upon determining that the identity is not an email address:
checking the identity table associated with the further user for any alternate identities that are email addresses;
upon locating at least one alternate identity that is an email address, sending the email to said at least one alternate identity; and
upon locating no alternate identities that are email addresses, sending a message to said identity to notify the associated further user about the email from the first user and inviting the further user to add an email address identity to the associated user account; and
upon determining that the identity associated with the further user does not currently reside in an identity table of a user account, sending a message to said identity to notify the associated further user about the email from the first user and inviting the further user to set up a user account.

8. The method of claim 7, further comprising the step of providing the first user with at least one of the identity status and identity score associated with the further user.

9. The method of claim 8, wherein the step of providing the user with at least one of the identity status and identity score further comprises the steps of:
- displaying on the email interface an appropriate notification regarding the identity status associated with said identity; and
- displaying on the email interface an appropriate notification regarding the identity score associated with said identity.

10. The method of claim 9, wherein the step of displaying on the email interface an appropriate notification regarding the identity status associated with said identity further comprises the step of displaying a status icon positioned adjacent the identity in the recipient field.

11. The method of claim 9, wherein the step of displaying on the email interface an appropriate notification regarding the identity score associated with said identity further comprises the step of displaying a score icon positioned adjacent the identity in the recipient field.

12. The method of claim 8, further comprising the step of, upon locating more than one alternate identity that is an email address, sending the email to the alternate identity having the highest identity score.

13. The method of claim 8, further comprising the step of, upon locating more than one alternate identity that is an email address, sending the email each of the alternate identities.

14. The method of claim 7, further comprising the steps of:
- allowing the first user to selectively designate the email as private; and
- upon the further user receiving and attempting to access the private email:
  - upon determining that the further user does not have a mobile phone associated with the user account of the further user, requiring the further user to associate a mobile phone with the user account of the further user prior to allowing access to the email;
  - upon determining that the further user is attempting to access the email using a mobile phone associated with the user account of the further user, providing access to the further user via the mobile phone; and
  - upon determining that the further user is attempting to access the email using a computing device other than a mobile phone associated with the user account of the further user:
    - upon determining that the computing device is within sufficient proximity to the mobile phone associated with the user account of the further user, providing access to the further user via the computing device.

15. The method of claim 14, wherein the step of requiring the further user to associate a mobile phone with the user account of the further user further comprises the steps of:
- allowing the further user to add a phone number associated with the mobile phone as a new identity in connection with the user account associated with the further user; and
- validating said new identity.

16. The method of claim 14, wherein the step of determining that the computing device is within sufficient proximity to the mobile phone associated with the user account of the further user further comprises the steps of:
- transmitting unique identifying data associated with at least one of the further user and mobile phone, stored in memory on the mobile phone, to the computing device; and
- the computing device automatically detecting the presence of the mobile phone by matching the mobile phone with expected parameters based on said identifying data.

17. The method of claim 7, further comprising the steps of:
- allowing the first user to selectively designate the email as read-only; and
- upon the further user receiving and attempting to access the read-only email:
  - verifying that the further user is authorized to access the read-only email;
  - decrypting the read-only email; and
  - displaying the contents of the read-only email using a message display application residing in memory on a computing device in the possession of the further user.

18. The method of claim 17, further comprising the step of preventing the further user from forwarding or otherwise sending the read-only email to any other users.

19. A method for validating and managing an at least one identity of an at least one user, the method comprising the steps of:
- implementing a central computing system configured for receiving and processing data related to the at least one user and associated identity;
- using a computing device in communication with the computing system to set up a user account associated with a one of the at least one user, the user account containing at least one of a unique account identifier, an identity score representing a quality rating of the user based on the at least one identity associated therewith, and an identity table containing at least one of an identity type, an identity source, an identity status, a validation status, an initial validation date, and a latest validation date;
- selectively validating the at least one identity;
- dynamically calculating the identity score associated with the at least one user,
- wherein for each identity contained in the identity table of the user account associated with the user:
  - upon determining that said identity has been previously validated, adding a pre-determined amount of points to the identity score;
  - upon determining that the initial validation date associated with said identity is sufficiently old, multiplying said points by a first pre-determined bonus multiplier; and
  - upon determining that the latest validation date associated with said identity is sufficiently recent, multiplying said points by a second pre-determined bonus multiplier;
- whereby, the higher the identity score is for a given user, the more the at least one identity associated with that user can be trusted by other users.

20. A method for validating and managing an at least one identity of an at least one user, the method comprising the steps of:
- implementing a central computing system configured for receiving and processing data related to the at least one user and associated identity;
- using a computing device in communication with the computing system to set up a user account associated with a one of the at least one user, the user account containing an identity table containing the at least one identity; and upon a first user desiring to send an email to an identity associated with a further user:
  allowing the first user to specify the identity associated with the further user to which the email is to be sent;
  upon determining that the identity associated with the further user currently resides in an identity table of a user account:
    upon determining that the identity is an email address, sending the email to said identity;
    upon determining that the identity is not an email address:
      checking the identity table associated with the further user for any alternate identities that are email addresses;
      upon locating at least one alternate identity that is an email address, sending the email to said at least one alternate identity; and
      upon locating no alternate identities that are email addresses, sending a message to said identity to notify the associated further user about the email from the first user and inviting the further user to add an email address identity to the associated user account; and
  upon determining that the identity associated with the further user does not currently reside in an identity table of a user account:
    sending a message to said identity to notify the associated further user about the email from the first user and inviting the further user to set up a user account.

* * * * *